(12) United States Patent
Ko

(10) Patent No.: US 8,319,753 B2
(45) Date of Patent: Nov. 27, 2012

(54) OPTICAL PEN AND OPTICAL TOUCH SYSTEM WITH SAME

(75) Inventor: Chun-Cheng Ko, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 474 days.

(21) Appl. No.: 12/718,093

(22) Filed: Mar. 5, 2010

(65) Prior Publication Data

US 2011/0073385 A1 Mar. 31, 2011

(30) Foreign Application Priority Data

Sep. 30, 2009 (CN) .......................... 2009 1 0308018

(51) Int. Cl.
*G06F 3/033* (2006.01)
*G06F 3/042* (2006.01)

(52) U.S. Cl. ........ 345/179; 345/180; 345/182; 345/183; 178/18.03; 178/18.09; 178/19.01; 178/19.05

(58) Field of Classification Search .... 178/18.01–18.11, 178/19.01–19.07; 345/173–183
See application file for complete search history.

(56) References Cited

U.S. PATENT DOCUMENTS

| 5,845,982 A * | 12/1998 | Shih .................................. 353/42 |
| 6,474,888 B1 * | 11/2002 | Lapstun et al. ................. 401/45 |
| 6,550,997 B1 * | 4/2003 | King et al. ....................... 401/45 |
| 6,808,330 B1 * | 10/2004 | Lapstun et al. ................. 401/45 |
| 7,168,867 B2 * | 1/2007 | Lapstun et al. ................. 400/62 |
| 7,249,901 B2 * | 7/2007 | Lapstun et al. ................. 400/88 |
| 7,336,267 B2 * | 2/2008 | Lapstun et al. ............... 345/179 |
| 7,396,177 B2 * | 7/2008 | Lapstun et al. ................. 401/45 |
| 7,396,178 B2 * | 7/2008 | Lapstun et al. ............... 401/195 |
| 7,445,394 B2 * | 11/2008 | Lapstun et al. ................. 401/46 |
| 2006/0176287 A1 * | 8/2006 | Pittel et al. .................... 345/179 |
| 2006/0176288 A1 * | 8/2006 | Pittel et al. .................... 345/179 |
| 2007/0030258 A1 * | 2/2007 | Pittel et al. .................... 345/179 |

* cited by examiner

*Primary Examiner* — Lun-Yi Lao
*Assistant Examiner* — Gene W Lee
(74) *Attorney, Agent, or Firm* — Altis Law Group, Inc.

(57) ABSTRACT

An optical pen is disclosed. The handwriting input pen includes a housing, a light source module received in the housing, an optical lens, a pen tip. The light source module is configured for emitting light. The optical lens is configured for converging light emitted from the light source module, the optical lens comprising an optical portion and a supporting portion around the optical portion. The pen tip is positioned at an end of the housing and is configured for guiding light out of the housing to project. The shielding member is around the optical portion attached to the optical lens and covering the supporting portion of the optical lens, and is configured for stopping the light passing through the supporting portion from entering into the pen tips.

15 Claims, 2 Drawing Sheets

OPTICAL PEN AND OPTICAL TOUCH SYSTEM WITH SAME

BACKGROUND

1. Technical Field

The present disclosure relates to optical pens and optical touch systems with the same.

2. Description of Related Art

An optical touch system includes an optical pen for projecting an infrared light spot onto an object and an infrared detector for capturing a track of the infrared light spot. The captured track of the infrared light spot can be processed and used for some applications, such as for inputting information.

The optical pen typically includes a housing, an infrared light source received in the housing for emitting infrared light, an optical lens configured for converging the light emitted from the light source and a pen tip positioned at an end of the housing for guiding the light out of the housing to project the infrared light onto an input area. In use, the light source emits light, and then the light passes through the optical lens and the pen tip and is projected onto the input area to form the infrared light spot. The detector is configured for detecting the track of the light spot. The optical lens generally includes an optical portion and a supporting portion around the optical portion. The optical portion is configured for converging light passing therethrough, and the supporting portion is configured for supporting the optical lens in the housing.

However, light emitted from the light source may enter into the supporting portion of the optical lens. When the light from the supporting portion is projected on the input area, undesired light spot may be formed on the input area. Therefore, the detecting accuracy of the detector may be reduced under the influence of the unwanted light spot, and even worse, the detector may misread the input information.

What is needed, therefore, is an optical pen and an optical touch system with the same to overcome the above-mentioned problems.

BRIEF DESCRIPTION OF THE DRAWINGS

The components of the drawings are not necessarily drawn to scale, the emphasis instead being placed upon clearly illustrating the principles of the embodiments of the optical pen and the optical touch system. Moreover, in the drawings, like reference numerals designate corresponding parts throughout several views.

DETAILED DESCRIPTION

Figure 1:
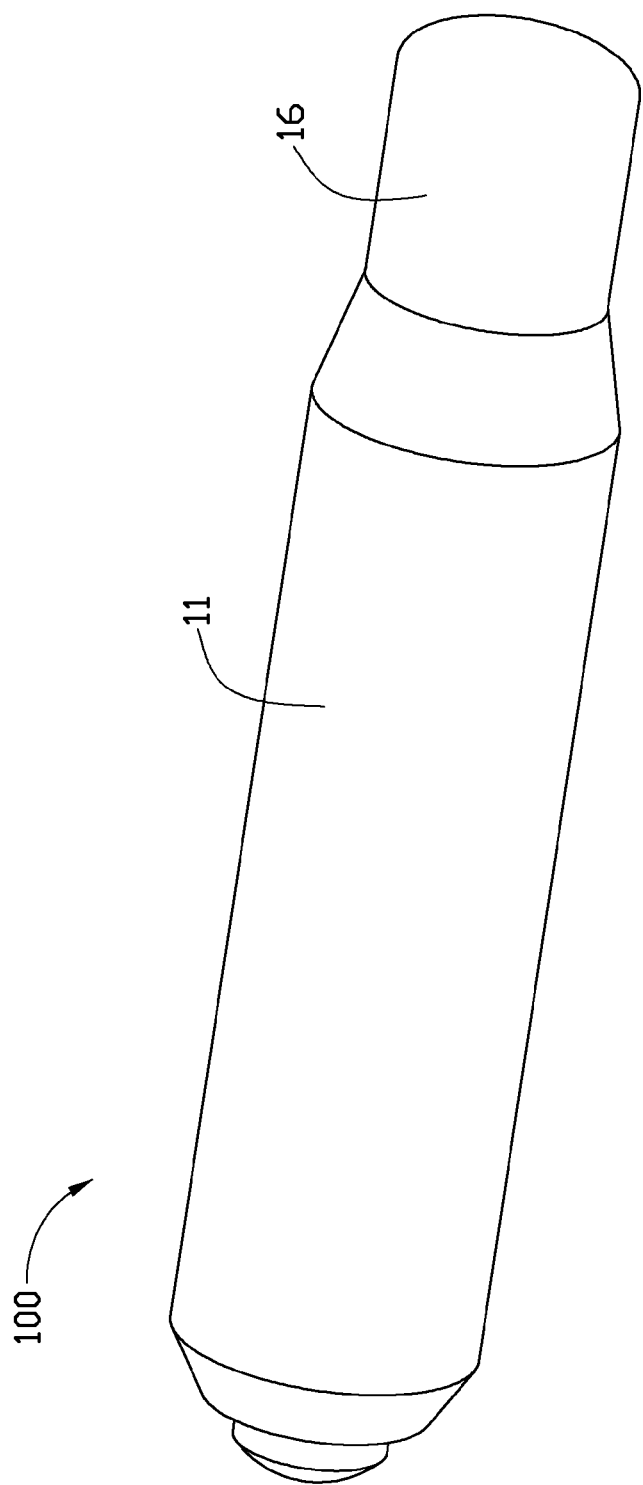
FIG. 1 is an isometric and schematic view of an optical pen, according to an exemplary embodiment of the present disclosure.
Figure 2:
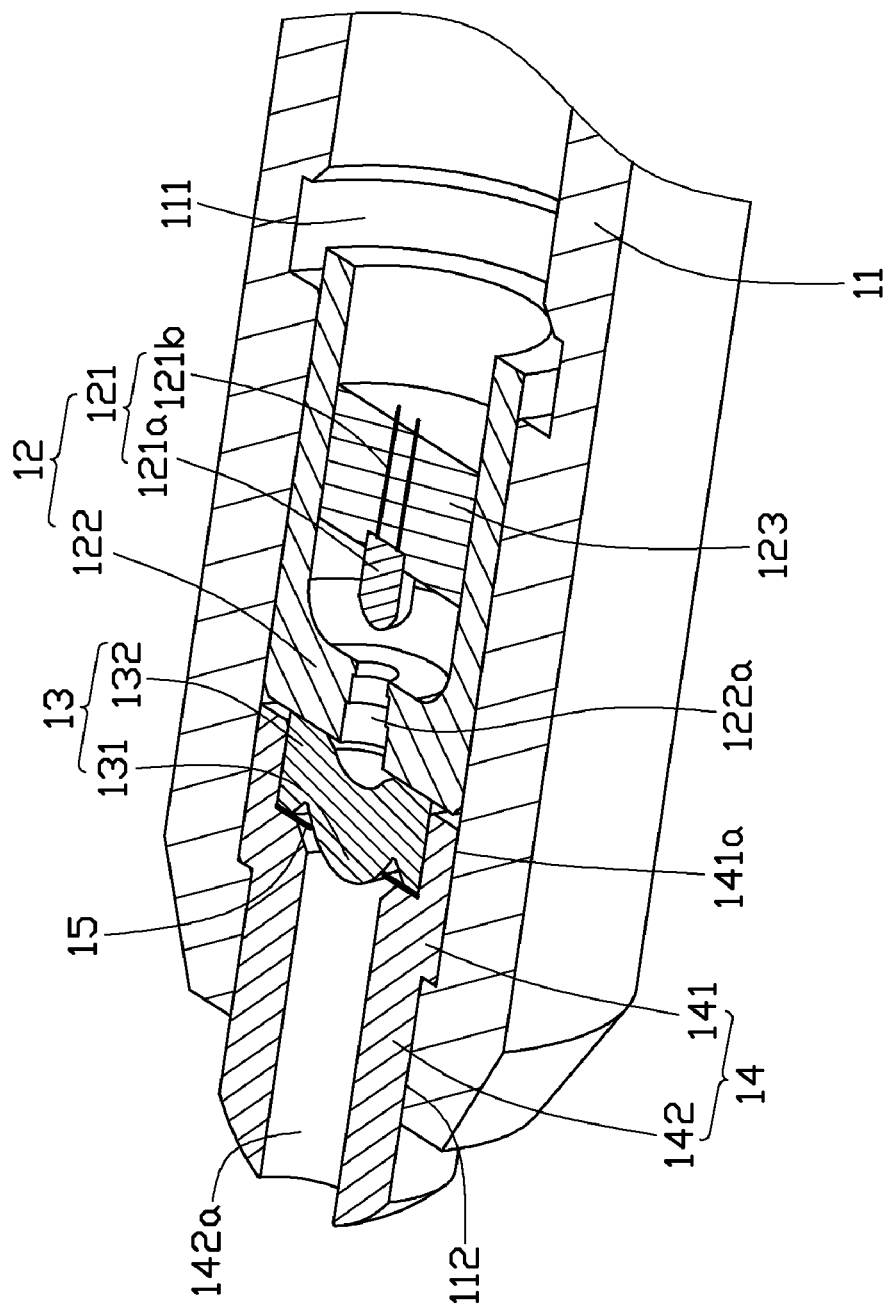
FIG. 2 is a partial sectional view of the optical pen of FIG. 1.

Referring to FIGS. 1-2, an optical pen 100, according to an exemplary embodiment, is shown. The optical pen 100 includes a housing 11, a light source module 12 received in the housing 11, an optical lens 13 and a pen tip 14.

The housing 11 is substantially a hollow cylinder suitable for handheld. The housing 11 defines a receiving space 111 for receiving the light source module 12, the optical lens 13, and the pen tip 14. The housing 11 further defines a through hole 112 on an end of the housing 11 communicating with the receiving space 111.

The light source module 12 is configured for emitting light. The light source module 12 includes a light source 121, a cover 122 and a fixing member 123. The light source 121 is fixed on the fixing member 123. The light source 121 includes a lighting portion 121a and two connection portions 121b connected to the lighting portion 121a and extending away from the lighting portion 121a. The lighting portion 121a faces the optical lens 13. Distal ends of the two connection portions 121b extend through the fixing member 123. The cover 122 is substantially a hollow cylinder. An end of the cover 122 facing the optical lens 13 defines a first light hole 122a. In this embodiment, the light source 121 is an infrared light-emitting diode.

The optical lens 13 includes an optical portion 131 and a supporting portion 132 around the optical portion 131. The optical portion 131 forms a convex lens for converging light. The supporting portion 132 is configured for supporting the optical lens 13 in the housing 11. The optical pen 100 further includes a shielding member 15 attached to the optical lens 13 and covering the supporting portion 132 of the optical lens 13. The shielding member 15 is configured for blocking light passing through the supporting portion 132 from entering into the pen tip 14. In this embodiment, the shielding member 15 is a circular ring and is opaque. The shielding member 15 is positioned at a side of the optical lens 13 near the pen tip 14. Alternatively, the shielding member 15 can be black paint applied on the supporting portion 132 of the optical lens 13.

The pen tip 14 is cylindrical and is configured for guiding light out of the housing 11. The pen tip 14 includes a fixing end 141 and a light passing portion 142 integrally connected to the fixing end 141. The diameter of the light passing portion 142 and the diameter of the through hole 112 are approximately the same. the diameter of the fixing end 141 is greater than that of the light passing portion 142. The light passing portion 142 extends through the through hole 112. The fixing end 141 defines a receiving hole 141a for receiving the optical lens 13. The light passing portion 142 defines a second light hole 142a communicating with the receiving hole 141a and configured for allowing light to pass therethrough.

The optical pen 100 further includes a battery unit (not shown), and a switch member 16. The battery unit provides electric power for the light source module 12. The two connecting portions 121b are connected to two electrodes of the battery unit correspondingly. The switch member 16 is configured for controlling the light source module 12 to turn on and turn off.

When the optical pen 100 is employed into an optical touch system (not shown). The light source 121 emits light. Emitted light travels through the optical lens 13 and then the pen tip 14, before projecting onto the input area. Projected light on the input area forms a light spot. Due to the shielding member 15, light passing through the supporting portion 132 of the optical lens 13 is blocked from entering into the pen tip 14. Therefore, undesired light spots on the input area can be eliminated. The optical touch system further includes a detector for capturing a track of the light spot. The track of the light spot can be processed to facilitate inputs. As a result, the detecting accuracy of the detector of the optical touch system can be enhanced, and erroneous input from the optical touch system can be avoided or at least reduced.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An optical pen, comprising:
a housing;
a light source module received in the housing and configured for emitting light;
an optical lens configured for converging the light emitted from the light source module, the optical lens comprising an optical portion and a supporting portion around the optical portion;
a pen tip positioned at an end of the housing and configured for guiding and projecting the light out of the housing; and
a shielding member around the optical portion attached to the optical lens and covering the supporting portion, the shielding member being configured for blocking the light passing through the supporting portion from entering into the pen tip;
wherein the housing defines a receiving space for receiving the light source module, the optical lens, and the pen tip, the housing further defines a through hole on the end of the housing communicating with the receiving space; and
wherein the pen tip comprises a fixing end and a light passing portion integrally connected to the fixing end, the diameter of the light passing portion and the diameter of the through hole are approximately the same, and the diameter of the fixing end is greater than that of the light passing portion, the light passing portion extends through the through hole.

2. The optical pen of claim 1, wherein the fixing end defines a receiving hole for receiving the optical lens, the light passing portion defines a second light hole communicating with the receiving hole for allowing light to pass therethrough.

3. The optical pen of claim 1, wherein the light source module comprises a light source, a cover receiving the light source, and a fixing member fixed in the cover, the light source is fixed on the fixing member.

4. The optical pen of claim 3, wherein the light source comprises a lighting portion and two connection portions connected to the lighting portion and extending away from the end of the lighting portion, the lighting portion faces the optical lens, distal ends of the two connection portions extend through the fixing member, an end of the cover facing the optical lens defines a first light hole aligned with the lighting portion.

5. The optical pen of claim 3, wherein the light source is an infrared light-emitting diode.

6. The optical pen of claim 1, wherein the optical portion forms a convex lens for converging light, the supporting portion is configured for supporting the optical lens in the housing.

7. The optical pen of claim 1, wherein the shielding member is a circular and is opaque, the shielding member is positioned at a side of the optical lens near the pen tip.

8. The optical pen of claim 1, wherein the shielding member is black paint applied on the supporting portion of optical lens.

9. An optical pen, comprising:
a housing;
a light source module received in the housing and configured for emitting light;
an optical lens configured for converging the light emitted from the light source module, the optical lens comprising an optical portion and a supporting portion around the optical portion;
a pen tip positioned at an end of the housing and configured for guiding and projecting the light out of the housing; and
a shielding member around the optical portion attached to the optical lens and covering the supporting portion, the shielding member being configured for blocking the light passing through the supporting portion from entering into the pen tip;
wherein the light source module comprises a light source, a cover receiving the light source, and a fixing member fixed in the cover, the light source is fixed on the fixing member; and
wherein the light source comprises a lighting portion and two connection portions connected to the lighting portion and extending away from the end of the lighting portion, the lighting portion faces the optical lens, distal ends of the two connection portions extend through the fixing member, an end of the cover facing the optical lens defines a first light hole aligned with the lighting portion.

10. The optical pen of claim 9, wherein the light source is an infrared light-emitting diode.

11. The optical pen of claim 9, wherein the optical portion forms a convex lens for converging light, the supporting portion is configured for supporting the optical lens in the housing.

12. The optical pen of claim 9, wherein the shielding member is a circular and is opaque, the shielding member is positioned at a side of the optical lens near the pen tip.

13. The optical pen of claim 9, wherein the shielding member is black paint applied on the supporting portion of optical lens.

14. An optical pen, comprising:
a housing;
a light source module received in the housing and configured for emitting light;
an optical lens configured for converging the light emitted from the light source module, the optical lens comprising an optical portion and a supporting portion around the optical portion;
a pen tip positioned at an end of the housing and configured for guiding and projecting the light out of the housing; and
a shielding member around the optical portion attached to the optical lens and covering the supporting portion, the shielding member being configured for blocking the light passing through the supporting portion from entering into the pen tip;
wherein the shielding member is black paint applied on the supporting portion of optical lens.

15. The optical pen of claim 14, wherein the optical portion forms a convex lens for converging light, the supporting portion is configured for supporting the optical lens in the housing.

* * * * *